Oct. 6, 1942.　　　　W. J. ZILER　　　　2,298,258
PORTABLE CEMENTING APPARATUS
Filed March 21, 1941　　　2 Sheets-Sheet 1

INVENTOR
WILLIAM J. ZILER
BY
Griswold & Burdick
ATTORNEYS

Oct. 6, 1942.  W. J. ZILER  2,298,258
PORTABLE CEMENTING APPARATUS
Filed March 21, 1941  2 Sheets-Sheet 2

INVENTOR
WILLIAM J. ZILER
BY
Griswold & Burdick
ATTORNEYS

Patented Oct. 6, 1942

2,298,258

UNITED STATES PATENT OFFICE 2,298,258

PORTABLE CEMENTING APPARATUS

William J. Ziler, Midland, Mich., assignor to The Dow Chemical Company, Midland, Mich., a corporation of Michigan Application March 21, 1941, Serial No. 384,519

3 Claims. (Cl. 259—164)

The invention relates to portable cementing equipment and more particularly has reference to a portable apparatus for producing a cement-water slurry for use in connection with cementing operations in deep wells, such as oil wells.

It is essential that cementing equipment for use in deep well cementing operations be self-powered or motorized so that it can be readily driven from one location to another. At the same time when a well is reached it is desirable that the cementing equipment be readily rendered operative and accessible without the necessity of detaching any of it from the truck.

It is, therefore, one of the objects of the invention to provide a cementing apparatus which is portable and at the same time readily adjustable so that it may be operatively positioned without the necessity of detaching any of the equipment from the truck.

Other objects and advantages will be apparent when the following description of the invention is considered in connection with the accompanying drawings wherein.

Figure 1:
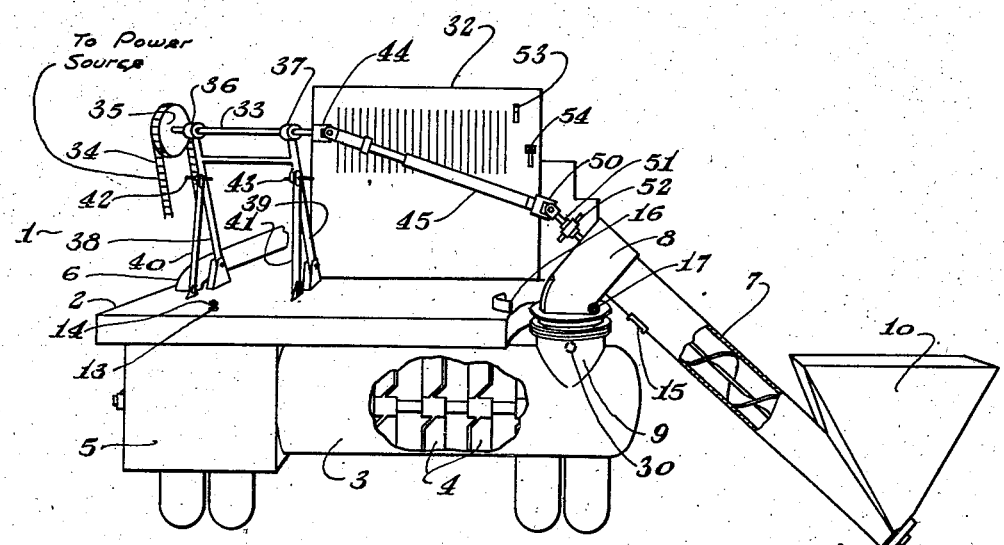
Fig. 1 is an elevational view partly in cross section showing the association of the cementing equipment with a motor truck and positioned for carrying out a cementing operation.
Figure 2:
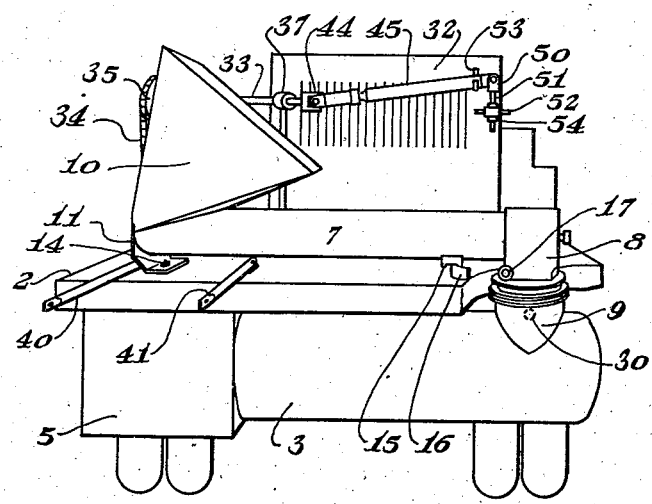
Fig. 2 is an elevational view showing the cement forwarding means raised and positioned on the truck platform.
Figure 3:
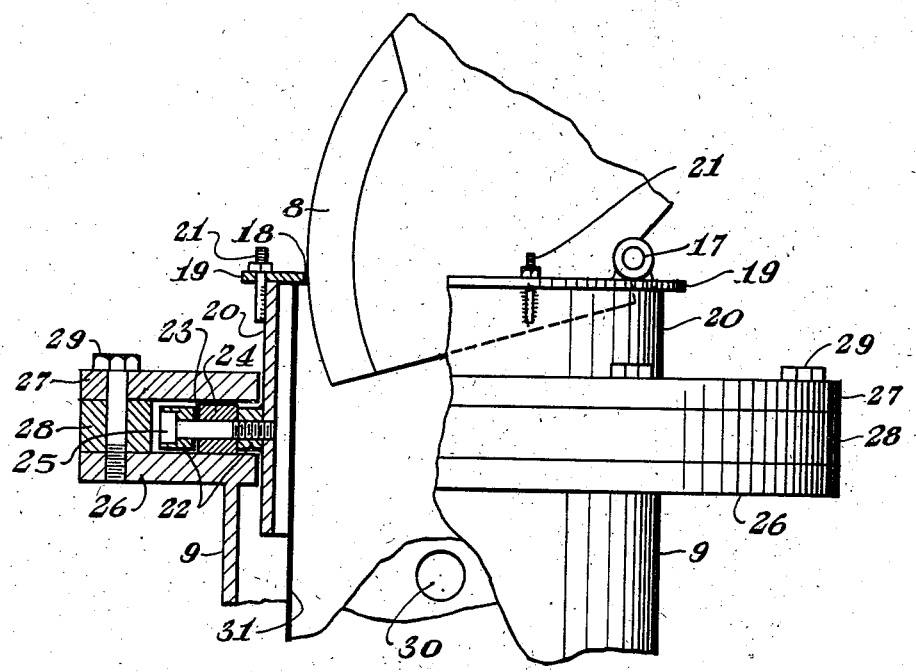
Fig. 3 is an enlarged detailed view of that portion of the assembly allowing rotation and elevational adjustment of the cement forwarding means.

Referring to Fig. 1 the motor truck 1 is provided with a platform 2 which acts to support the housing 3 of the cement mixing apparatus. Mixing paddles 4 are arranged within the housing 3 and act to produce an intimate mixture of cement and water and forward it to the collecting chamber 5 situated at one end of the housing 3. A pipe 6 communicates with the collecting chamber 5 and provides a means through which the cement slurry may be withdrawn from the collecting chamber. A screw conveyer 7 communicates with the mixing chamber housing 3 through a discharge head 8 and a suitable spout 9. A hopper 10 is provided at the other end of the conveyer as a receptacle for the cement powder being forwarded by the screw conveyer. The hopper end of the screw conveyer 7 is equipped with a foot member 11 which serves to support the conveyer on the ground and on the truck. A hole 12 in the foot member 11 is adapted to register with hole 13 on the truck platform whereby the conveyer assembly may be held in position on the platform by means of bolt or pin 14 positioned in holes 12 and 13 as shown in Fig. 2. A lug member 15 secured to the bottom of the conveyer housing is adapted to engage and ride on the segment of circular track 16 mounted on the truck platform as the conveyer is raised and rotated onto the truck platform. The conveyer discharge head 8 extends into the cement mixer spout 9 and is pivoted on pin 17, thus allowing the conveyer to be raised and lowered while the discharge head remains in substantially sealed communication with the spout 9. The construction of the discharge head 8 of the cement conveyer which allows raising and lowering of the conveyer and rotation about the spout 9 will be more readily understood with reference to the more detailed view shown in Fig. 3. As shown in Fig. 3 one face of the conveyer discharge head 8 is provided with a curved lower end having a radius of curvature substantially equal to the distance from the center of the pivot pin 17 to the edge of the opening 18 in the spout 9. This construction allows the conveyer to be raised or lowered while the discharge head moves about the pivot pin 17 in the hole 18 cut in the plate member 19. The plate 19 is secured to a short tubular member 20 as by means of bolts 21. A ring 22 encircles the tubular member 20 and is secured thereto as by welding. The ring 22 is provided with a series of slots as shown at 23 into which roller bearings 24 are placed and secured as by means of bolts 25. The bearings 24 are adapted to roll on the flanged end 26 of the mixer spout 9 and are held in position on the flanged end by the plate 27, spaced from the flanged end 26 by means of spacer ring 28. The plate 27, spacer ring 28, and the flanged end of the mixer spout are secured together by means of bolts 29. The mixer spout 9 is also shown equipped with a water inlet 30 through which gauging water is introduced into the mixer. A tubular shroud 31 is attached to plate member 19 and extends down to a point below the water inlet serving as a means whereby cement and water are prevented from coming into intimate contact until actual entry into the mixing chamber where they are contacted by the mixing blades.

Figure 4:
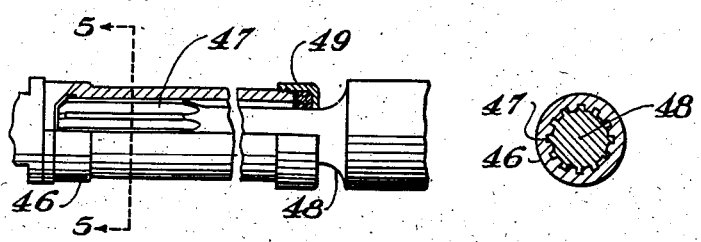
Fig. 4 is a detailed view of a section of the drive shaft driving the cement forwarding means showing the construction of the drive shaft which allows the shaft to assume varying lengths while operatively associated with the cement forwarding means.
Figure 5:
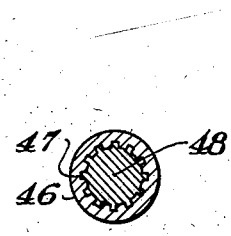
Fig. 5 is an end view of the drive shaft taken along lines 5—5 of Fig. 4.

Referring again to Fig. 1, an auxiliary motor 32 delivers power to shaft 33 through chain 34 and sprocket 35 and serves as a means of driving the screw conveyer. The shaft 33 is suitably supported in bearings 36 and 37 pivotally mounted on rods or braces 38 and 39, respectively. The rods 38 and 39 are braced by short pivotally mounted rods or braces 40 and 41 which are releasably secured to the braces 38 and 39 by pins 42 and 43. The end of shaft 33 is equipped with a universal coupling 44 which connects the shaft to variable length shaft assembly 45. The shaft assembly 45 is designed so that it can assume varying lengths and this effect is achieved as shown in Figs. 4 and 5 in the following manner. A short section of tubing 46 connected to the universal coupling 44 is internally splined at one end as shown in Fig. 4. The splined portion of tubular member 46 designated by numeral 47 engages the complementarily splined shaft 48. The end of the hollow tubular member 46 is threaded and engages a cap member 49 which acts to prevent the shaft 48 from sliding completely out of engagement with the tubular member 46. The splining in the tubular member 46 is of greater length than that of the shaft 48 and thus allows the shaft 48 to slide in the internally splined member 46 producing a shaft assembly adapted to assume varying lengths. Referring again to Fig. 1, a second universal joint 50 is shown connecting the shaft 45 to screw conveyer shaft 51. The conveyer shaft 51 is equipped with a handle bar union 52 of conventional design and thus provides a means whereby the conveyer shaft may be detachably secured together. When the union 52 is unscrewed the shaft assembly 45 is adapted to be clamped against the auxiliary motor 32 by clamp 53 and further supported by threadedly engaging complementary union portion 54.

Although the variable length shaft illustrated and described is greatly preferred, a flexible power transmission shaft of conventional design may be employed to transmit power to the cement forwarding means, in which case the flexibility of the power transmission shaft will allow the conveyer or the like to assume varying angles of inclination during operation. An equally applicable method of driving the conveyer is that employing a hydraulic pump and motor combination interconnected by flexible tubing or hose. In this case speed regulation is accomplished by regulation of the speed of the pump or by varying the amount of fluid being delivered in proportion to the requirement of the motor.

The operation of the apparatus will be best understood from the following description. With the apparatus positioned as shown in Fig. 1 a cementing operation will be carried out by applying power so as to cause the screw conveyer to be rotated. At the same time water is started to the mixing chamber through the water pipe 30 and the mixing blades 4 are caused to rotate. The cement slurry formed is directed to the collecting chamber 5 at one end of the mixer where it is picked up through pipe 6 and forwarded to the desired location. Since the drive shaft assembly 45 is of variable length, the ground on which the truck sets during operation does not have to be selected with particular care as regards being exactly level. This feature is of great practical value because it eliminates the necessity of blocking up the conveyer to an exact height each time a cementing operation is carried out. For example, since the variable length shaft is self-adjusting during operation excessive stress is not thrown on the drive shaft due to imperfect adjustment or slipping of blocking, if such is employed, under the conveyer hopper. After the desired amount of finished mix has been produced operation of the apparatus will be stopped and it will be desired to move the apparatus to another location. This will necessitate swinging the screw conveyer and hopper onto the truck platform in the following manner. The union 52 will first be broken or unscrewed and the pins 42 and 43 withdrawn from the pivotally mounted bracing legs 38, 40, 39 and 41. This allows brace legs 40 and 41 to drop over onto the truck platform as shown in Fig. 2. The variable length shaft assembly 45 together with shaft 33 and its accompanying parts may then be pushed back toward auxiliary motor 32 to make room on the truck platform for the screw conveyer. The shaft assembly 45, connected shaft 33, sprocket 35, and brace legs 38 and 39 are held out of the way by clamping shaft assembly 45 in clamp 53 and securing the detached half of union 52 to complementary union half 54. Thereafter the conveyer is raised and rotated until lug 15 on the bottom of conveyer 7 engages track 16 on the truck platform. The conveyer is then slid onto the truck platform until hole 12 in the conveyer foot member registers with hole 13 in the truck platform as shown in Fig. 2. Pin 14 may then be placed in the registering holes whereby the conveyer is securely held on the truck platform. The portable apparatus is then ready for moving to another location where a cementing operation is to be carried out.

The apparatus of the invention is thus especially adaptable for use in connection with cementing operations where portability and ready accessibility of the apparatus is highly desirable and essential. In this connection the apparatus has been found to be especially useful for oil well cementing operations wherein the cementing equipment must be frequently moved to remote well sites.

I claim:

1. In a portable cementing apparatus the combination which includes a truck, a mixing chamber having an inlet and an outlet, a cement conveyer having a feed hopper at one end and a discharge conduit at the other end communicating with the mixing chamber through a discharge head, said discharge head consisting of a tubular member fixedly attached to the mixing chamber, a second tubular member rotatably attached to the first tubular member, said second tubular member telescoping over and being hingedly attached to the conveyer discharge conduit whereby the conveyer is capable of movement in horizontal and vertical planes relative to the mixing chamber, a drive shaft for transmitting power to said conveyer, and means for delivering water to the mixing chamber.

2. In a portable cementing apparatus the combination which includes a truck, a mixing chamber having an inlet and an outlet carried by the truck, a screw conveyer having a feed hopper at one end and communicating at the other end with the mixing chamber through a discharge head, said discharge head being rotatably and hingedly attached to the mixing chamber whereby the screw conveyer is capable of movement in horizontal and vertical planes relative to the mixing chamber, a variable length drive shaft connected at one end to a driving means and adapted to be detachably connected at the other end to the screw conveyer whereby the conveyer may be carried on a truck platform disconnected from the drive shaft and thereafter swung from the truck platform and positioned with its hopper supported near the ground at varying degrees of inclination relative to the truck, and means for delivering water to the mixing chamber.

3. In a portable cementing apparatus the combination which includes a truck, a mixing chamber having an inlet and an outlet, said mixing chamber being suspended below the truck platform, a screw conveyer having a feed hopper inlet and discharge conduit, said discharge conduit communicating with the mixing chamber through the mixing chamber inlet, said mixing chamber inlet consisting of a tubular member fixedly attached to the mixing chamber, a second tubular member adapted to rotate about the first tubular member on supported bearings, said second tubular member telescoping over and being hingedly attached to the conveyer discharge conduit, a drive shaft for transmitting power to said conveyer, and means for delivering water to the mixing chamber.

WILLIAM J. ZILER.